UNITED STATES PATENT OFFICE 2,150,472

FERRATED COLLOIDAL MOLYBDENUM

Percy R. Vessie, Briarcliff Manor, N. Y., assignor to Florence Armstrong Vessie, Blythewood, Greenwich, Conn.

No Drawing. Application December 20, 1937, Serial No. 180,831

3 Claims. (Cl. 167—72)

My invention relates to ferrated colloidal molybdenum and to the method of its preparation.

I have already described colloidal molybdenum and the method of its preparation in my Patent No. 2,025,405 of Dec. 24, 1935. My colloidal molybdenum, being water soluble, stable and non-toxic, represents a valuable medicinal preparation which can be used in treatment of certain diseases and this particular form of molybdenum will be hereinafter called for the sake of brevity "colloidal molybdenum".

Further research in connection with molybdenum preparations has led me to a discovery that it is possible to combine my colloidal molybdenum with certain ferrous salts in such manner that the resultant product possesses remarkable new physical and biologic properties, acting as a catalyst in accelerating the assimilation of iron by hemoglobin. This property renders the compound very valuable for treating anemia iron deficiency. Any soluble ferrous salt can be used for this purpose, but I obtained the best results with ferrous sulphate adsorbed by the colloidal molybdenum, the product being ferrated molybdenum, very stable, non-toxic and possessing catalytic properties as mentioned above. The ferrous salt remains adsorbed by the colloidal molybdenum, as I have been able to prove by dialysis. The operation is preferably conducted at an increased temperature. One of the methods of preparation of my ferrated molybdenum is by adding ferrous sulfate to colloidal molybdenum prepared in accordance with disclosure in my foregoing patent. The reaction is usually conducted at the temperature of about 75° C. and is completed in about three hours, the last hour being required for the addition and adsorption of the iron sulfate.

The solution contains colloidal molybdenum with adsorbed ferrous sulfate having a dark gray or yellowish-gray color. It can be precipitated from the solution by various organic solvents such as ethyl or methyl alcohol, acetone, mixture of alcohol and ether, mixture of alcohol and acetone, etc.

It is also possible to obtain the water soluble colloidal product by molybdenum and iron as a dry powder by directly evaporating the solution prepared by the foregoing method. The evaporation may be conducted on a boiling water bath, or at the room temperature, over sulfuric acid in vacuo, for instance. In either case the colloidal molybdenum and adsorbed iron sulfate is obtained as an amorphous substance, often in the form of a powder. Its color depends on the nature and quantity of a protective colloid used and varies from a light gray to yellowish dark gray hues. This substance is highly stable and keeps for an indefinite length of time without any change. It dissolves completely in hot water.

It may be noted that the colloidal molybdenum prepared as specified in my foregoing patent, contains a non-toxic protective colloid and usually traces of formaldehydesodiumsulfoxylate. The protective colloid, such as gum arabic, renders the compound stable and enables it to be taken up by water to form a solution from a powder form. A small admixture of formaldehydesodiumsulfoxylate is not harmful and does not render the product toxic, as it is explained in the foregoing patent. Its excess, however, can be removed by thoroughly washing with methyl or ethyl alcohol because these solvents readily dissolve formaldehydesodiumsulfoxylate, so that substantially all of it can be removed. The product obtained by my method represents a stable water soluble adsorption product of colloidal molybdenum and iron sulfate possessing a negligible toxicity.

It should be noted, however, that my colloidal molybdenum may consist wholly or in part of molybdenous oxide whose presence, however, does not change the catalytic properties of the product.

Clinical observations have shown that my ferrated colloidal molybdenum is non-toxic, and even daily dosage of as much as 12 grains does not cause any concomitant reactions, either general or local. The preparation is administered orally and consists largely of an iron salt, the usual proportion being 3 grains of an iron salt, such as ferrous sulfate, and ¼ grain of my colloidal molybdenum powder. The proportion may vary, however, within certain limits, as for instance, between 5 to 15 parts of an iron salt to one part by weight of my colloidal molybdenum powder. As mentioned above, colloidal molybdenum may contain molybdenous oxide, and in my experiments I obtained fully satisfactory results even when the solution contained only molybdenous oxide. The term of "colloidal molybdenum" used herein must therefore embrace not only metallic molybdenum but also molybdenous oxide.

*Example I.*—1 gram of colloidal molybdenum powder such as prepared by my method explained or described in the foregoing patent is dissolved in 5 cc. of water and 12 grams of ferrous sulfate is added gradually and dissolved. The colloidal molybdenum with adsorbed ferrous sulfate is precipitated with 40 cc. of methyl alcohol. The mixture is left standing for several hours in an ice box. Then it is filtered off on a Buechner funnel and thoroughly washed with alcohol followed by anhydrous ether in order to remove the excess of formaldehydesodiumsulfoxylate and aid in drying it. The resulting very fine light-gray powder is finally dried in vacuo over sulfuric acid. The removal of formaldehydesodiumsulfoxylate is usually necessary in view of my method of obtaining colloidal molybdenum as explained in my foregoing patent.

*Example II.*—For every gram of the resulting molybdenum colloid prepared in accordance with my foregoing patent, 12 grams of ferrous sulfate is added as follows:

The 12 grams of iron sulphate are divided into 3 portions of 2 grams, 5 grams and 5 grams respectively. The first portion of iron salt is added to the colloidal molybdenum solution followed immediately by 1,000 c. c. methyl alcohol. As precipitation proceeds the supernatant liquid is sucked off, as for instance by suction, and as much formaldehydesodiumsulphoxylate removed as possible. Sufficient distilled water is added to bring the volume up to approximately one-quarter of its original amount.

The first 5 gram portion is then added, followed immediately by 1,000 c. c. alcohol and finally the last 5 gram portion of iron sulphate is added followed by 1,000 c. c. alcohol.

The resulting solution is allowed to stand until the precipitate has settled. Then it is sucked off on a Buechner funnel and thoroughly washed with 2,000 c. c. methyl alcohol and 1,000 c. c. anhydrous ether in order to remove any excess formaldehydesodiumsulfoxylate and aid in drying it. The resulting light greyish powder is dried in vacuo over sulphuric acid and paraffine.

The molybdenum ferrous sulfate adsorption product in powder form is stable and keeps for an indefinite length of time. For dissolving this precipitate in water it is necessary to heat the precipitate with water until dissolved.

My ferrated colloidal molybdenum has distinct new physical and biological properties as evidenced not only by its catalytic action on hemoglobin in accelerating the rate of iron assimilation, but also by the fact that ferrated colloidal molybdenum is non-constipating unlike the ferrous salts used in its preparation.

I claim as my invention:

1. A ferrated colloidal molybdenum consisting of colloidal molybdenum with adsorbed ferrous sulfate.

2. A ferrated colloidal molybdenum consisting of colloidal molybdenum with adsorbed water soluble ferrous salt.

3. A method of preparation of ferrated colloidal molybdenum consisting in adding ferrous sulfate to an aqueous solution of colloidal molybdenum containing a small admixture of formaldehydesodiumsulfoxylate, precipitating the adsorption product by adding a substance taken from the group consisting of alcohol acetone, and ether, and removing the excess of formaldehydesodiumsulfoxylate by washing with the substances taken from said group.

PERCY R. VESSIE.